United States Patent Office 3,268,554
Patented August 23, 1966

1

3,268,554
SUBSTITUTED ENDO-PERHYDRO-4,7-METHANO-
ISOINDOLES AND INTERMEDIATES THEREIN
James W. Bolger, Canoga Park, Calif., assignor to Rexall
Drug and Chemical Company, Los Angeles, Calif., a
corporation of Delaware
No Drawing. Filed Dec. 17, 1964, Ser. No. 419,210
5 Claims. (Cl. 260—326.1)

This application is a continuation-in-part of my application Serial No. 176,399, filed February 28, 1962, entitled "Substituted Endo-Perhydro-4,7-Methanoisoindoles, Process Therefor and Intermediates Obtained Therein," and now abandoned.

This invention relates to compositions of matter classified in the art of chemistry as substituted isoindoles and to intermediates obtained in the synthesis.

The invention sought to be patented, in its final product composition aspect, is described as residing in the concept of an 8-diphenylmethyl - endo - perhydro - 4,7-methanoisoindole to the nitrogen atom of which (2-position) there is attached an alkyl group of 1 to 12 carbon atoms bearing a cyano, halo, di-lower alkylamino or lower acyloxy group, and the hereinafter described equivalents thereof.

The invention sought to be patented, in a first intermediate composition aspect, also resides in the concept of 7-diphenylmethyl-endo-bicyclo-[2,2,1]-heptane-2,3-dicarboxylic anhydride and its hereinafter described equivalents.

The invention sought to be patented, in a second intermediate composition aspect, also resides in the concept of a 7-diphenylmethyl-endo-bicyclo-[2,2,1]-heptane-2,3-dicarboximide to the nitrogen atom of which there is attached an alkyl group of 1 to 12 carbon atoms bearing a di-lower alkylamino group, and its hereinafter described equivalents.

As used throughout the application, the expression "alkyl group of 1 to 12 carbon atoms" embraces straight and branched chain alkyl groups having the requisite number of carbon atoms, reference to substitution upon such an alkyl group meaning that the substituent can replace any hydrogen atom of the alkyl group, irrespective of its location on the alkyl chain; the term "halo" embraces chloro, fluoro, bromo and iodo; the term "lower alkyl" embraces straight and branched chain alkyl groups containing 1 to 6 carbon atoms; and the term lower acyloxy embraces straight and branched chain acyl groups linked to an oxygen atom, such acyl groups being derived from aliphatic carboxylic acids containing 1 to 6 carbon atoms.

The tangible embodiments of my invention, in its final product and intermediate composition aspects, possess the inherent general physical properties of being white, crystalline solids. Ultra-violet spectral data reveal no unsaturation except as present in the benzene rings. The aforementioned physical characteristics, taken together with the nature of the starting material and the mode of synthesis positively confirm the structure of the compounds sought to be patented.

2

The tangible embodiments of my invention, in its final product composition aspect, possess the inherent applied use characteristics of having significant pharmacological activity as anticholinergic and hypotensive agents as determined by recognized and accepted pharmacological test procedures.

The tangible embodiments of my invention, in its intermediate composition aspects, possess the inherent applied use characteristics of being useful and valuable chemical intermediates in the production of the tangible embodiments of my invention, in its final product composition aspect, by the reaction sequence to be described in detail hereinafter.

The manner and process of making and using the invention will now be generally described so as to enable a person skilled in the art of chemistry to make and use the same as follows:

The starting material 7 - diphenylmethylene - endo-bicyclo-[2,2,1]-hept-5-ene-2,3-dicarboxylic anhydride is a known compound described by Diels and Alder, Ber. 62, 2081 (1929), and may be prepared, for example, by the reaction of diphenylfulvene and maleic anhydride at room temperature in an inert organic solvent such as benzene.

The preparation of substituted isoindoles of my invention is depicted by the following equations illustrating the preparation of the specific final product N-dimethyl-aminoethyl - 7 - diphenylmethyl - endo - perhydro - 4,7-methanoisoindole:

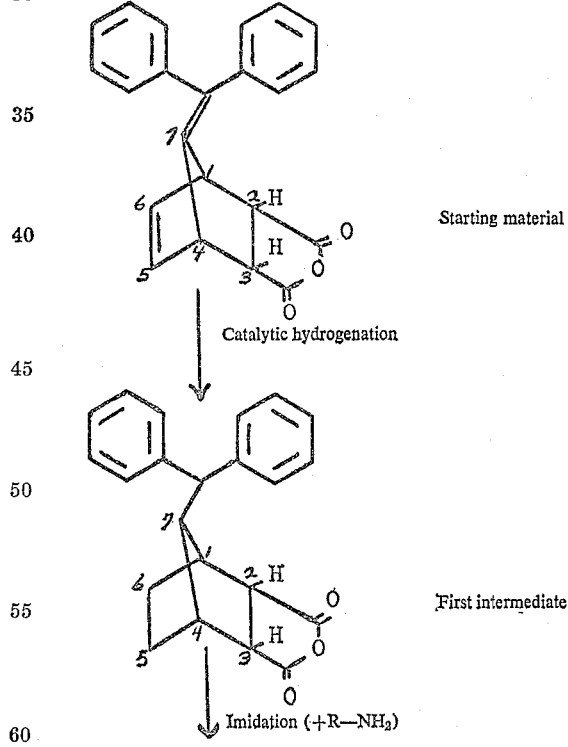

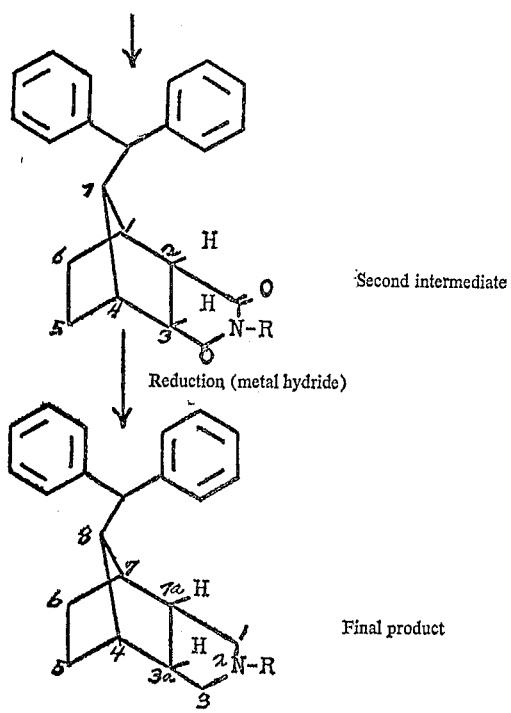

Second intermediate

Reduction (metal hydride)

Final product where R is

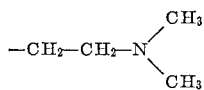

The initial step in the reaction sequence is the catalytic hydrogenation of the starting material to saturate the two non-aromatic double bonds. The starting material is dissolved in an inert solvent, such as tetrahydrofuran, and the hydrogenation is carried out in the presence of a noble metal catalyst, for example platinum, palladium, rhodium, ruthenium and mixtures thereof, preferably on a suitable catalyst support such as carbon. Completion of the reaction is shown by the uptake of 2 mols of hydrogen per mol of starting material. With active catalysts, such as palladium on carbon, the hydrogenation may be carried out at room temperature to completion. With less active catalysts, heating of the reaction mixture to temperatures of not more than 100° C. after the uptake of the first mol of hydrogen is necessary to effect uptake of the second mol of hydrogen.

The second step in the reaction sequence is the conversion of the tangible embodiments of my invention, in its first intermediate composition aspect, to the tangible embodiments of my invention, in its second intermediate composition aspect, by replacing the ring oxygen atom of the dicarboxylic anhydride structure with a nitrogen atom linked to a di-lower alkylaminoalkyl group containing 1 to 12 carbon atoms in the alkyl chain and its equivalents wherein the lower alkyl substituents on the tertiary amino nitrogen atom are joined through a carbon linkage or through an oxygen or nitrogen atom to form a heterocyclic group, such equivalents including piperidinoalkyl, pyrrolidinoalkyl, piperazinoalkyl, morpholinoalkyl and the like. The reaction is one of imidation and involves treatment of the dicarboxylic anhydride structure (first intermediate) with a compound of the formula R—NH$_2$ where R is di-lower alkylamino alkyl, the alkyl portion containing 1 to 12 carbon atoms, or its above described equivalents. Useful imidating agents include dimethylaminoethylamine, diethylaminoethylamine, diethylamino - (n-hexyl)amine, 2-dibutylamino-2-ethyl-(n-propyl)amine, 3-dimethylamino-(n-dodecyl)amine and the like.

The reaction of substituted endo-bicyclo-[2,2,1]-heptane-2,3-dicarboxylic anhydrides with an imidating agent is carried out by heating the reactants together at elevated temperatures in excess of 150° C. The solid product obtained upon cooling the reaction mixture after completion of the reaction is purified by crystallization from organic solvents, such as benzene and mixtures of tetrahydrofuran and chloroform. Alternately, the product as the free base may be converted into an acid addition salt, such as the hydrochloride or hydrobromide and purified in this form.

As an alternate procedure, the reaction can be carried out by, first, treating the anhydride with methanol to open the anhydride ring and form a half methyl ester of the corresponding acid, and, second, treating the so-produced half ester with a mixture of the imidating agent and methanol, thereby to produce the substituted dicarboximide of my invention.

The third step in the reaction sequence is the conversion of the tangible embodiments of my invention, in its second intermediate composition aspect, to certain tangible embodiments of my invention, in its final product composition aspect, by treatment with a metal hydride reducing agent, such as lithium aluminum hydride, potassium borohydride, sodium borohydride, lithium tri-(t-butoxy) aluminum hydride and the like. The reaction is carried out under reflux in the presence of an inert oxygenated solvent such as tetrahydrofuran, ether and the like. Upon completion of the reaction, residual reducing agent is decomposed by the addition of aqueous alkali and the product is recovered from the solution by conventional techniques of crystallization.

The above description has related to the preparation of final products in which the nitrogen atom of the methanoisoindole structure bears a di-lower alkylaminoalkyl group. The following procedure is followed to prepare the other embodiments of this invention in its final product composion aspect.

Final products in which the nitrogen atom bears a haloalkyl group are prepared by a sequence of steps involving (a) treatment of the first intermediate with a hydroxyalkylamine, the alkyl portion containing 1 to 12 carbon atoms, by an imidation reaction as above described to prepare an N-hydroxyalkyl-7-diphenylmethyl-endo-bicyclo-[2,2,1]-heptane-2,3-dicarboximide, (b) treatment of the dicarboximide with a metal hydride reducing agent to form an N-hydroxyalkyl-8-diphenylmethyl-endo-perhydro-4,7-methanoisoindole, and (c) treatment of the isoindole with a thionyl halide, thereby converting the hydroxy group to a halo group.

Treatment of such N-haloalkyl substituted isoindoles with an alkali metal cyanide, such as sodium cyanide, results in the preparation of those substituted isoindoles of my invention having a cyanoalkyl substituent of 1 to 12 carbon atoms in the alkyl chain on the nitrogen atom of the isoindole ring.

Alternately, such N-cyanoalkyl substituted isoindoles can be prepared by the treatment of the substituted isoindoles having a hydrogen substituent on the ring nitrogen atom with an unsaturated nitrile having a terminal double bond, such as acrylonitrile.

Esterification of the N-hydroxyalkyl-8-diphenylmethyl-endo-perhydro-4,7-methanoisoindoles prepared as described above with anhydrides or acid chlorides of aliphatic carboxylic acids containing 1 to 6 carbon atoms results in the conversion of the hydroxy group to a loweracyloxy group, resulting in the preparation of final products in which the nitrogen atom of the isoindole structure bears a lower-acyloxyalkyl group.

7-diphenylmethylene substituted dicarboxylic anhydride starting materials wherein either one or both of the phenyl groups of the diphenylmethylene substituent bear one or more groups such as lower alkyl, for example methyl, ethyl, n-propyl, isobutyl and the like, lower alkoxy, for example methoxy, ethoxy, propoxy, butoxy and the like, halogen, for example, chlorine, bromine, fluorine or iodine, and trifluoromethyl are the full equivalent of the 7-diphenylmethylene - endo - bicyclo - [2,2,1]-hept-5-ene-2,3-dicarboxylic anhydride starting material, and are either known compounds or can be prepared in the same manner as described hereinabove by the reaction of an appropriately substituted diphenylfulvene with maleic anhydride. Each of these starting materials is useful for conducting the above described reaction sequences thereby to produce substituted isoindole final products having the same utility as final product wherein the diphenylmethyl group is unsubstituted.

The tangible embodiments of my invention, in its final product composition aspect, may, if desired be converted into their non-toxic pharmaceutically acceptable acid addition and quaternary ammonium salts by conventional procedures. Typical acid addition salts include the hydrochloride, hydrobromide, citrate, maleate, sulfate, nitrate and the like. Typical quaternary ammonium salts are those formed with such alkyl halides as methyl iodide, ethyl bromide, n-hexyl bromide and the like. Such salts are the full equivalent of the free bases and are included within the scope of my invention.

The tangible embodiments of my invention, either as the free base or in the form of a non-toxic pharmaceutically acceptable acid addition or quaternary ammonium salt, may be combined with conventional pharmaceutical diluents and carriers, to form such dosage forms as tablets, capsules, solutions, suspensions, suppositories and the like.

The best mode contemplated by the inventor of carrying out his invention will now be set forth as follows:

EXAMPLE 1

(a) 7-diphenylmethyl-endo-bicyclo-[2,2,1]-heptane-2,3-dicarboxylic anhydride

7 - diphenylmethylene - endo - bicyclo - [2,2,1]-hept-5-ene-2,3-dicarboxylic anhydride (90 grams) is hydrogenated in 1800 ml. of tetrahydrofuran at room temperature and 1 atmosphere of pressure using 10% carbon supported palladium as catalyst. A hydrogen uptake of 2 moles occurs in about 16 to 18 hours. The catalyst is then filtered off and the filtrate concentrated under vacuum. The concentrate is diluted with petroleum ether (30–60° C.) to yield 68 grams of white crystalline solid, M.P. 186–187° C.

Analysis.—Calculated for $C_{22}H_{20}O_3$ (M.W. 332): C, 79.49%; H, 6.06%. Found: C, 79.39%; H, 5.89%.

(b) N-dimethylaminoethyl-7-diphenylmethyl-endo-bicyclo-[2,2,1]-heptane-2,3-dicarboximide HCl The anhydride (50 g., 0.15 mole), prepared as described in step "a," and 14 grams (0.15 mole) of dimethylaminoethylamine are heated together for one hour at 190° C. Upon cooling a brown solid is obtained which is converted to a crystalline hydrochloride with gaseous hydrogen chloride. Recrystallization from absolute ethanol/ether affords 32.6 grams of white crystalline solid, M.P. 243–245° C.

Analysis.—Calculated for $C_{26}H_{31}N_2O_2Cl \cdot \frac{1}{2}H_2O$ (M.W. 448.0): C, 69.70%; H, 7.20%; N, 6.25%. Found: C, 69.60%; H, 7.0%; N, 6.70%.

(c) N-dimethylaminoethyl-8-diphenylmethyl-endo-perhydro-4,7-methanoisoindole (di-HCl-salt)

The hydrochloride salt of N-dimethylaminoethyl-7-diphenylmethyl - endo - bicyclo - [2,2,1] - heptane - 2,3-dicarboximide (30 grams) is converted to the free base with 30 ml. of aqueous 25% sodium hydroxide. Ether is used to extract the free base from the aqueous solution. The dried ether solution of the free base is slowly added to an ether solution containing 11 grams (0.288 mole) of lithium aluminum hydride. The reaction is worked up in the usual manner and the product is isolated as the dihydrochloride salt; Yield: 24.7 grams (82%), M.P. 255° C.

Analysis.—Calculated for $C_{26}H_{36}N_2Cl_2 \cdot \frac{1}{2}H_2O$ (M.W. 456.5): C, 68.40%; H, 8.17%; N, 6.14%; Cl 15.55%. Found: C, 68.2%; H, 8.78%; N, 6.94%; Cl, 15.44%.

The following examples illustrate the preparation of other tangible embodiments of this invention:

EXAMPLE 2

(a) N-(2-hydroxyethyl)-7-diphenylmethyl-endo-bicyclo-[2,2,1]-heptane-2,3-dicarboximide The anhydride formed as described in step "a" of Example 1 (50 g., 0.15 mole) and 18.3 grams (0.3 mole) of ethanolamine are heated together at 220° C. for about an hour. The liquid reaction product is then poured into 100 ml. of benzene. The crude crystalline solid is collected and recrystallized from methylene chloride/hexane, to yield 42 grams of white crystalline solid, M.P. 225–227° C.

Analysis.—Calculated for $C_{24}H_{25}NO_3$: C, 76.77%; H, 6.71%; N, 3.73%. Found: C, 76.64%; H, 6.58%; N, 3.74%.

(b) N-(2-hydroxyethyl)-8-diphenylmethyl-endo-perhydro-4,7-methanoisoindole (HCl salt)

N - (2 - hydroxyethyl) - 7 - diphenylmethyl - endo-bicyclo-[2,2,1]-heptane-2,3-dicarboximide (76.1 g., 0.205 mole) is dissolved in 1000 ml. of tetrahydrofuran and the resulting solution is slowly added to a solution consisting of 25 grams of lithium aluminum hydride and 500 ml. of anhydrous ether. The resulting mixture is refluxed for 48 hours, then decomposed by the successive addition of 26 ml. water, 20 ml. 20% aqueous sodium hydroxide and 92 ml. of water. After stirring for two hours the solution is filtered and the filter cake washed with tetrahydrofuran and methylene chloride. The combined washes are dried over magnesium sulfate, decolorized with Norit®, acidified to Congo red with hydrogen chloride gas and concentrated in vacuo to yield 88 grams of crude solid. This solid is recrystallized from absolute ethanol/ether to give 55 grams of white crystals, which upon recrystallization gives material with M.P. 214–215° C.

Analysis.—Calculated for $C_{24}H_{30}ONCl$ (M.W. 383.95): C, 75.08%; H, 7.88%; Cl, 9.23%. Found: C, 74.70%; H, 7.90%; Cl, 9.26%.

(c) N-(2-chloroethyl)-8-diphenylmethyl-endo-perhydro-4,7-methanoisoindole (HCl)

The 2-hydroxyethyl derivative formed as described in Example 1 (41 g., 0.108 mole), 100 ml. of methylene chloride and 40 ml. of thionyl chloride are mixed together and stirred. After 3 hours the resulting clear solution is diluted with ether to induce crystallization and 41 grams of solid is obtained, M.P. 244–250° C. This is recrystallized from methylene chloride/petroleum ether (30–60° C.) to give a solid with a melting point of 255–258° C.

Analysis.—Calculated for $C_{24}H_{29}NCl_2$: C, 71.63%; H, 7.27%; Cl, 17.62%. Found: C, 71.73%; H, 7.12%; Cl, 17.48%.

EXAMPLE 3

N - (2 - cyanoethyl) - 8 - diphenylmethyl-endo-perhydro-4,7-methanoisoindole (HCl salt)

Then grams (0.0249 mole) of N-(2-chloroethyl)-8-diphenylmethyl - endo - perhydro - 4,7-methanoisoindole (HCl) are converted to the free base and then added slowly to a hot (100° C.) solution of sodium cyanide (1.35 g., 0.276 mole) in 50 ml. of dimethylsulfoxide. The crude product N-(2-cyanoethyl)-8-diphenylmethyl-endo-perhydro-4,7-methanoisoindole hydrochloride obtained by cooling the reaction mixture and the addition of water, is recrystallized from ethanol. Yield, 3.5 g. (36%), M.P. 251–252° C.

Analysis.—Calculated for $C_{25}H_{29}NCl_2$ (M.W. 392.96): C, 76.41%; H, 7.44%; Cl, 9.02%. Found: C, 76.31%; H, 7.18%; Cl, 9.12%.

EXAMPLE 4

N - (2 - acetoxyethyl) - 8-diphenylmethyl-endo-perhydro-4,7-methanoisoindole (HCl salt)

Three grams of N-(2-hydroxyethyl)-8-diphenylmethyl-endo-perhydro-4,7-methanoisoindole prepared as described in Example 2(b) are suspended in 10 ml. of methylene chloride.

To this suspension are added 3 ml. of acetic anhydride. After stirring for 16 hours a clear solution is obtained. Ether is added to precipitate the ester hydrochloride. The product is recrystallized from methylene chloride/ether. Yield: 3 g., M.P. 215–217° C.

*Analysis.*—Calculated for $C_{26}H_{32}NClO_2$ (M.W. 426): C, 73.30%; H, 7.57%; Cl, 8.32%. Found: C, 73.36%; H, 7.40%; Cl, 8.36%.

The following example illustrates the preparation of N - (2-cyanoethyl)-8-diphenylmethyl-endo-perhydro-4,7-methanoisoindole by an alternate route:

EXAMPLE 5

(a) 7 - diphenylmethyl-endo-bicyclo-[2,2,1]-heptane-2,3-dicarboximide

The anhydride (50 g., 0.15 mole) prepared as described in step "a" of Example 1 is mixed and ground with 5.5 grams of ammonium carbonate and then heated in an oil bath to 240° C. When the temperature reaches about 230° C. the mixture turns liquid and gaseous ammonia is bubbled through the solution to insure complete reaction. After two hours of additional heating the reaction mixture is poured into tetrahydrofuran/chloroform. The insoluble material is removed and petroleum ether (30–60° C. boiling range) is then added to induce crystallization of the imide. Thirty grams of white crystals are obtained, M.P. 248° C., recrystallization raises the M.P. to 256° C.

*Analysis.*—Calculated for $C_{22}H_{21}NO_2$ (M.W. 331): C, 79.73%; H, 6.39%; N, 4.23%. Found: C, 79.85%; H, 6.41%; N, 4.12%.

(b) 8 - diphenylmethyl-endo-perhydro-4,7-methanoisoindole (HCl salt)

7 - diphenylmethyl - endo-bicyclo-[2,2,1]-heptane-2,3-dicarboximide (18.5 g., 0.056 mole) is dissolved in about 400 ml. of tetrahydrofuran and reduced with 6.1 grams (0.16 mole) of lithium aluminum hydride by the procedure described in Example 1(c) (in the usual manner). The resulting amine is isolated as its hydrochloride salt. Recrystallization from ethanol/ether affords 6.9 grams of a white crystalline solid, M.P. 270–272° C. Several additional recrystallizations brings the M.P. to 280–283° C.

*Analysis.*—Calculated for $C_{22}H_{26}NCl$ (M.W. 399.9): C, 77.74%; H, 7.71%; N, 4.12%. Found: C, 75.09%; H, 7.9%; N, 4.5%.

(c) N - (2-cyanoethyl)-8-diphenylmethyl-endo-perhydro-4,7-methanoisoindole (HCl salt)

One hundred twenty-four grams of 8-diphenylmethyl-endo-perhydro-4,7-methanoisoindole hydrochloride, prepared as in (b) above, are converted to the free base. This is extracted with methylene dichloride, concentrated, combined with 12.5 ml. water and 40 ml. dimethylformamide and heated to around 100° C. Twenty grams (0.377 mole) of acrylonitrile are then slowly added. The product is recovered following dilution of the reaction mixture with methylene dichloride and acidification. Crystallization from anhydrous ether yields 44.6 g. desired product (34.2% yield), M.P. 251–252° C.

The subject matter which the applicant regards as his invention is particularly pointed out and distinctly claimed as follows.

I claim:

1. A compound of the formula

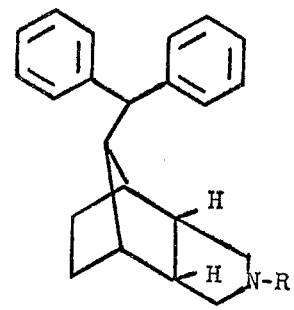

wherein R is an alkyl group of 1 to 12 carbon atoms bearing a member selected from the group consisting of di-lower alkylamino, halo, cyano and lower-acyloxy.

2. N - (2-acetoxyethyl)-8-diphenylmethyl-endo-perhydro-4,7-methanoisoindole.

3. N - dimethylaminoethyl-8-diphenylmethyl-endo-perhydro-4,7-methanoisoindole.

4. N - (2 - chloroethyl) - 8-diphenylmethyl-endo-perhydro-4,7-methanoisoindole.

5. N - (2 - cyanoethyl) - 8-diphenylmethyl-endo-perhydro-4,7-methanoisoindole.

References Cited by the Examiner

UNITED STATES PATENTS

| | | | |
|---|---|---|---|
| 2,813,877 | 11/1957 | Lambrech | 260—326 |
| 2,887,497 | 5/1959 | Hodes | 260—346.3 |
| 2,897,208 | 7/1959 | Phillips et al. | 260—326 |
| 3,084,167 | 4/1963 | Rice | 260—319 |
| 3,100,776 | 8/1963 | Poos | 260—319 X |
| 3,105,839 | 10/1963 | Renner | 260—346.3 |
| 3,124,595 | 3/1964 | Bolger | 260—319 |

FOREIGN PATENTS 336,397    4/1959    Switzerland.

HENRY R. JILES, *Acting Primary Examiner.*

MARY E. O'BRIEN, *Assistant Examiner.*